United States Patent
Fu

(10) Patent No.: US 8,960,630 B2
(45) Date of Patent: Feb. 24, 2015

(54) SUPPORT STRUCTURE

(75) Inventor: Bin Fu, Guangdong Province (CN)

(73) Assignee: Dongguan Techsoon Digital Technology Co., Ltd., Dongguan (CN)

( * ) Notice: Subject to any disclaimer, the term of this patent is extended or adjusted under 35 U.S.C. 154(b) by 212 days.

(21) Appl. No.: 13/271,308

(22) Filed: Oct. 12, 2011

(65) Prior Publication Data

US 2012/0074291 A1 Mar. 29, 2012

(30) Foreign Application Priority Data

Sep. 15, 2011 (TW) .............................. 100217310 A

(51) Int. Cl.
*A47G 1/24* (2006.01)
*F16M 13/00* (2006.01)
*F16M 11/10* (2006.01)
*F16M 11/40* (2006.01)

(52) U.S. Cl.
CPC ............... *F16M 13/00* (2013.01); *F16M 11/10* (2013.01); *F16M 11/40* (2013.01)
USPC ............ 248/560; 248/371; 248/454; 248/685

(58) Field of Classification Search
USPC ........... 248/560, 371, 454, 444, 188.2; 108/5; 24/67.9, 67.3, 306, 168
See application file for complete search history.

(56) References Cited

U.S. PATENT DOCUMENTS

| | | | | |
|---|---|---|---|---|
| 4,375,804 A | * | 3/1983 | Ciarlei et al. | 126/306 |
| 4,380,103 A | * | 4/1983 | McGrath et al. | 24/543 |
| 5,329,712 A | * | 7/1994 | Keller | 40/747 |
| 5,442,528 A | * | 8/1995 | Vandenbelt | 362/98 |
| 5,548,878 A | * | 8/1996 | Romagnoli | 24/306 |
| 5,732,928 A | * | 3/1998 | Chang | 248/688 |
| 6,089,216 A | * | 7/2000 | Harwath et al. | 124/44.5 |
| 6,102,353 A | * | 8/2000 | Dichter | 248/371 |
| 6,352,322 B1 | * | 3/2002 | Nakao | 312/223.1 |
| 6,766,994 B2 | * | 7/2004 | Serbinski et al. | 248/371 |
| 7,001,088 B2 | * | 2/2006 | Hui-hu | 400/681 |
| 7,062,822 B2 | * | 6/2006 | Folkmar | 24/30.5 R |
| 7,249,397 B2 | * | 7/2007 | Abels et al. | 24/132 R |
| 7,980,526 B2 | * | 7/2011 | Lord et al. | 248/444 |
| 8,074,956 B2 | * | 12/2011 | Wang et al. | 248/688 |
| 8,248,791 B2 | * | 8/2012 | Wang et al. | 361/679.59 |
| 8,297,440 B2 | * | 10/2012 | Schmidt et al. | 206/320 |
| 8,374,657 B2 | * | 2/2013 | Interdonato | 455/575.4 |
| 8,403,288 B2 | * | 3/2013 | Cheng | 248/688 |
| D679,271 S | * | 4/2013 | Liu | D14/250 |
| 2002/0158483 A1 | * | 10/2002 | Greenlee | 294/171 |
| 2003/0061688 A1 | * | 4/2003 | Rodriguez et al. | 24/67.5 |
| 2004/0206796 A1 | * | 10/2004 | Badillo et al. | 224/577 |
| 2008/0290303 A1 | * | 11/2008 | Mackal | 251/9 |
| 2010/0142130 A1 | * | 6/2010 | Wang et al. | 361/679.01 |
| 2010/0222118 A1 | * | 9/2010 | Interdanato | 455/575.6 |
| 2011/0034221 A1 | * | 2/2011 | Hung et al. | 455/575.8 |
| 2011/0036965 A1 | * | 2/2011 | Zhang et al. | 248/688 |
| 2012/0050966 A1 | * | 3/2012 | Liu et al. | 361/679.01 |
| 2012/0106091 A1 | * | 5/2012 | Huang et al. | 361/727 |

* cited by examiner

*Primary Examiner* — Terrell McKinnon
*Assistant Examiner* — Daniel Breslin
(74) *Attorney, Agent, or Firm* — Rabin & Berdo, P.C.

(57) ABSTRACT

A support structure includes: a base, having an accommodation slot; a support portion, having a first end and a second end, in which the first end is connected to the base and the second end is received in the accommodation slot; and an elastic part, located at the first end of the support portion and encapsulated by the support portion, in which when the first end experiences a force, the elastic part generates an elastic deformation to make the second end extend beyond the accommodation slot.

7 Claims, 6 Drawing Sheets

SUPPORT STRUCTURE

CROSS-REFERENCES TO RELATED APPLICATIONS

This non-provisional application claims priority under 35 U.S.C. §119(a) on Patent Application No. 100217310 filed in Taiwan, R.O.C. on Sep. 15, 2011, the entire contents of which are hereby incorporated by reference.

BACKGROUND OF THE INVENTION

1. Technical Field

The present invention relates to a support structure, and more particularly to a bendable support structure.

2. Related Art

Along with the progress of science and technology, all sorts of electronic devices are developed in the trend of light and thin volume. For instance, products such as mobile phones or tablet PCs are developed with qualities of lightness, chic appeal, and small overall volume in mind. Meanwhile, mobile phones and tablet PCs with light, thin and reduced volume may reduce the load on the hands when being held, and the light and thin design adds to operating convenience. Furthermore, the light and thin design meets the requirement of saving room when the mobile phone or the tablet PC is packed for travel.

Although the development trend of the electronic devices is towards light and thin devices, the user may still feel hand fatigue when holding an electronic device for a long time, so many users place the electronic device on a table top or another planar surface in order to avoid discomfort when holding the device in their hand.

Currently marketed electronic devices with a light and thin design mostly have a flat contour. When the user put the electronic device on the table, the electronic device is laid level with the table top or the planar surface, since the electronic device is flat. This placement manner may bring about inconvenience in reading and discomfort in operating, in breach of ergonomic principles.

SUMMARY

Accordingly, a support structure is provided, which includes: a base, having an accommodation slot; a support portion, having a first end and a second end, in which the first end is connected to the base and the second end is received in the accommodation slot; and an elastic part, located at the first end of the support portion and encapsulated by the support portion, in which when the first end experiences a force, the elastic part generates an elastic deformation to make the second end extend beyond the accommodation slot.

One end of the elastic part is located at the first end and the other end extends to the second end. The second end of the support portion is bent when the elastic part generates the elastic deformation and thus forms a bending portion.

Furthermore, the base further includes a body, in which the accommodation slot is located at a center of the body. The first end is connected to the body. The support portion further includes a connecting part, located at the first end and connected to the body. The body further includes a positioning part, and the connecting part includes a positioning hole, in which the positioning part locks a position of the positioning hole to join the first end to the body.

Furthermore, the first end may also be connected to a wall of the accommodation slot, and the support portion further includes a connecting part located at the first end and connected to the wall of the accommodation slot.

With the support portion and the elastic part located at the first end of the support portion and encapsulated by the support portion employed in the present invention, when the elastic part generates an elastic deformation to make the second end extend beyond the accommodation slot, the second end is laid on the planar surface and props up the electronic device, so that an angle is formed between the electronic device and the table top or the planar surface, thereby solving the problem of inconvenience in reading and operation.

The detailed features and advantages of the present invention are described below in great detail through the following embodiments, the content of the detailed description is sufficient for persons skilled in the art to understand the technical content of the present invention and to implement the present invention there accordingly. On the basis of the content of the specification, the claims, and the drawings, persons skilled in the art can easily understand the relevant objectives and advantages of the present invention.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
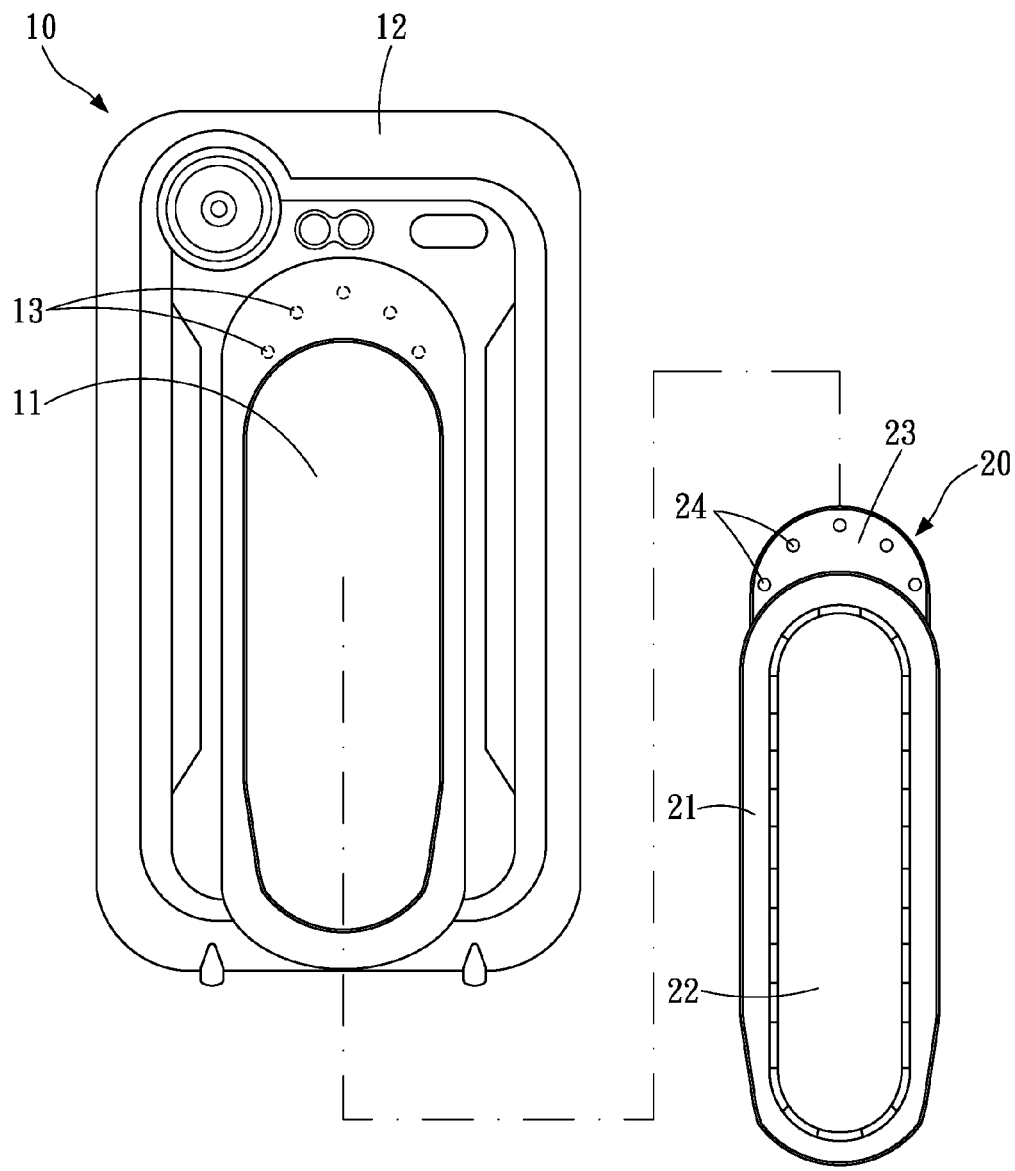
FIG. 1 is a schematic view of a support structure of the present invention.

Please refer to FIG. 1, in which a support structure disclosed in the present invention includes a base 10, a support portion 20 and an elastic part 30.

FIG. 1 is a schematic view of the support structure of the present invention. The base 10 has a substantial rectangular flat structure, and based on this, the base 10 may further extend to form a back plate of an electronic device and become a part of the electronic device. The base 10 further has an accommodation slot 11 and a body 12. The accommodation slot 11 has a substantial strip-shaped spatial structure, and is preferably located at a center of the body 12. In the present invention, two ends of the accommodation slot 11 are arched end points, but the spatial structure shape of the accommodation slot 11 is only exemplary and the present invention is not limited to this. For instance, the base 10 having the rectangular flat structure of the present invention may further extend to form a protection cover, that is, the body 12 extends to form a placement space, so that the electronic device may be put in the placement space and is thus protected by the protection cover formed by extending the body 12.

Figure 2:
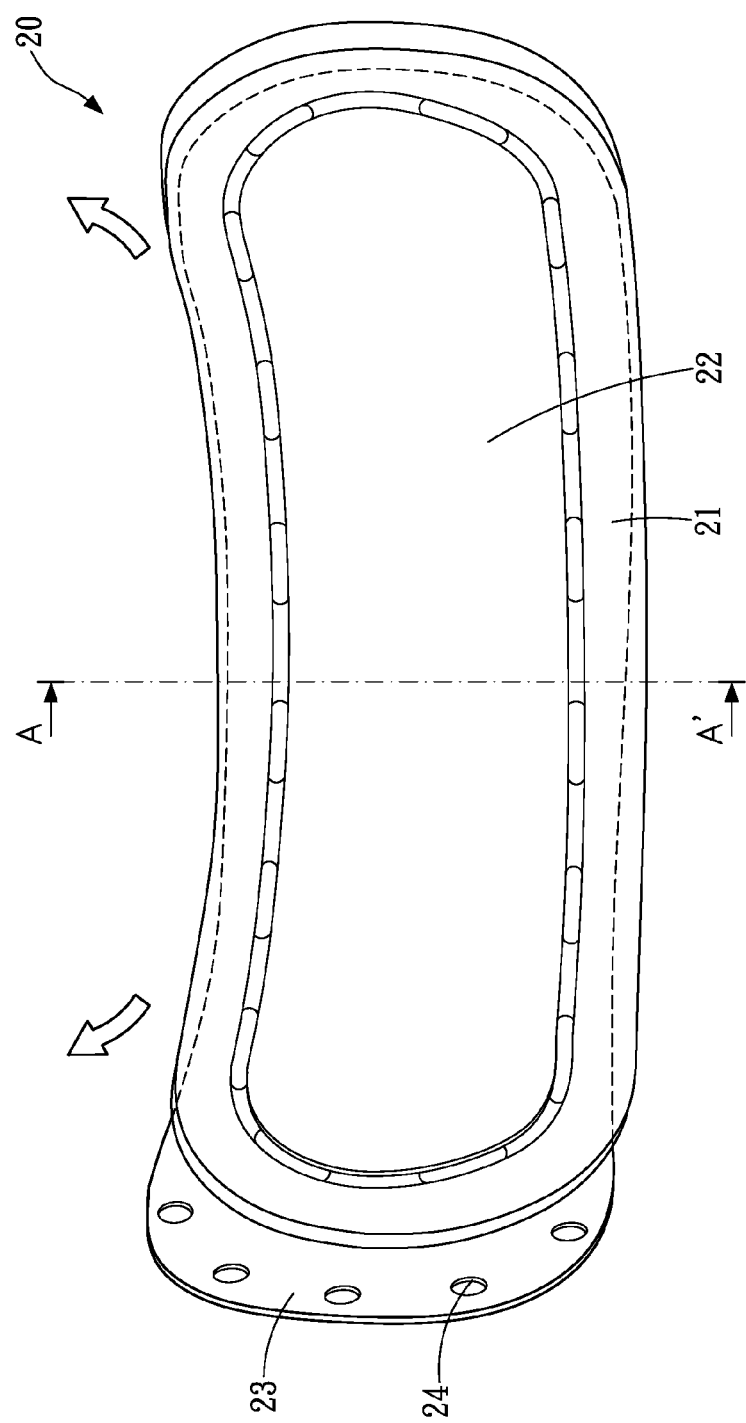
FIG. 2 is a schematic view of a support portion of the present invention when bent.

FIG. 2 is a schematic view of the support portion of the present invention when bent. Please refer to FIG. 2, in which the support portion 20 has a substantial strip-shaped flat structure, and is preferably designed corresponding to the spatial structure shape of the accommodation slot 11, so that the support portion 20 may be received in the accommodation slot 11. The support portion 20 has a first end 21 and a second end 22. The first end 21 is connected to the base 10, so the second end 22 is received in the accommodation slot 11, and further, the first end 21 is connected to the body 12.

Figure 3:
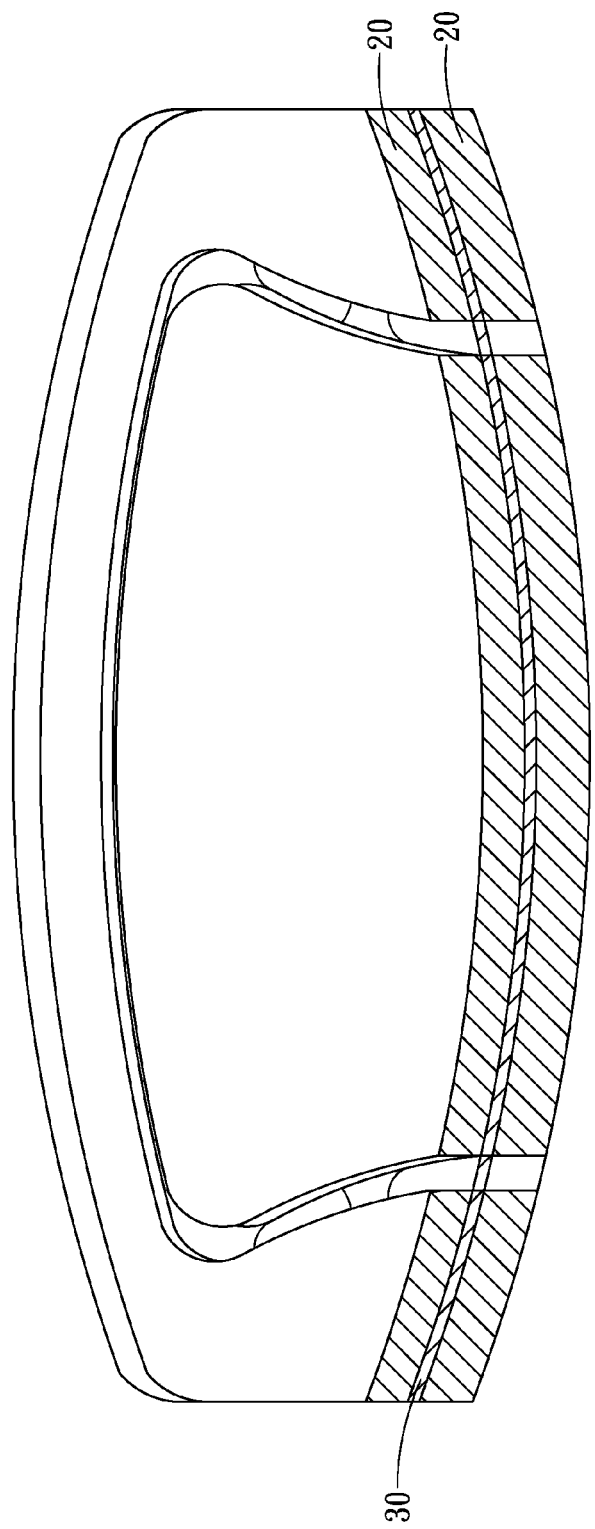
FIG. 3 is a cross-sectional view of the support portion of the present invention.

FIG. 3 is a cross-sectional view of the support portion of the present invention. Please refer to FIG. 3, in which the support structure of the present invention has the elastic part 30. A material of the elastic part 30 is preferably a Manganese spring steel or Manganese steel sheet, but the present invention is not limited to this. The elastic part 30 is located at a position of the first end 21 of the support portion 20 and is encapsulated by the support portion 20. In the present invention, the elastic part 30 is encapsulated in the support portion 20 by in-mold molding. Furthermore, referring to the cross-sectional view of FIG. 3, the elastic part 30 is sandwiched by the support portion 20 and forms the sequence relation of the support portion 20, the elastic part 30 and the support portion 20.

Figure 4:
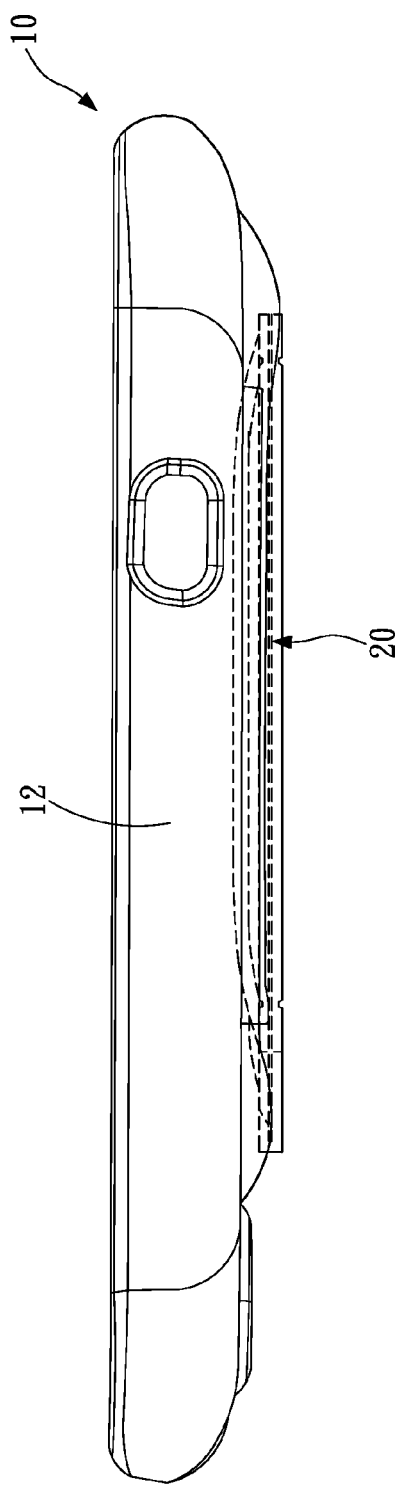
FIG. 4 is a schematic view of the support portion of the present invention when received.
Figure 5:
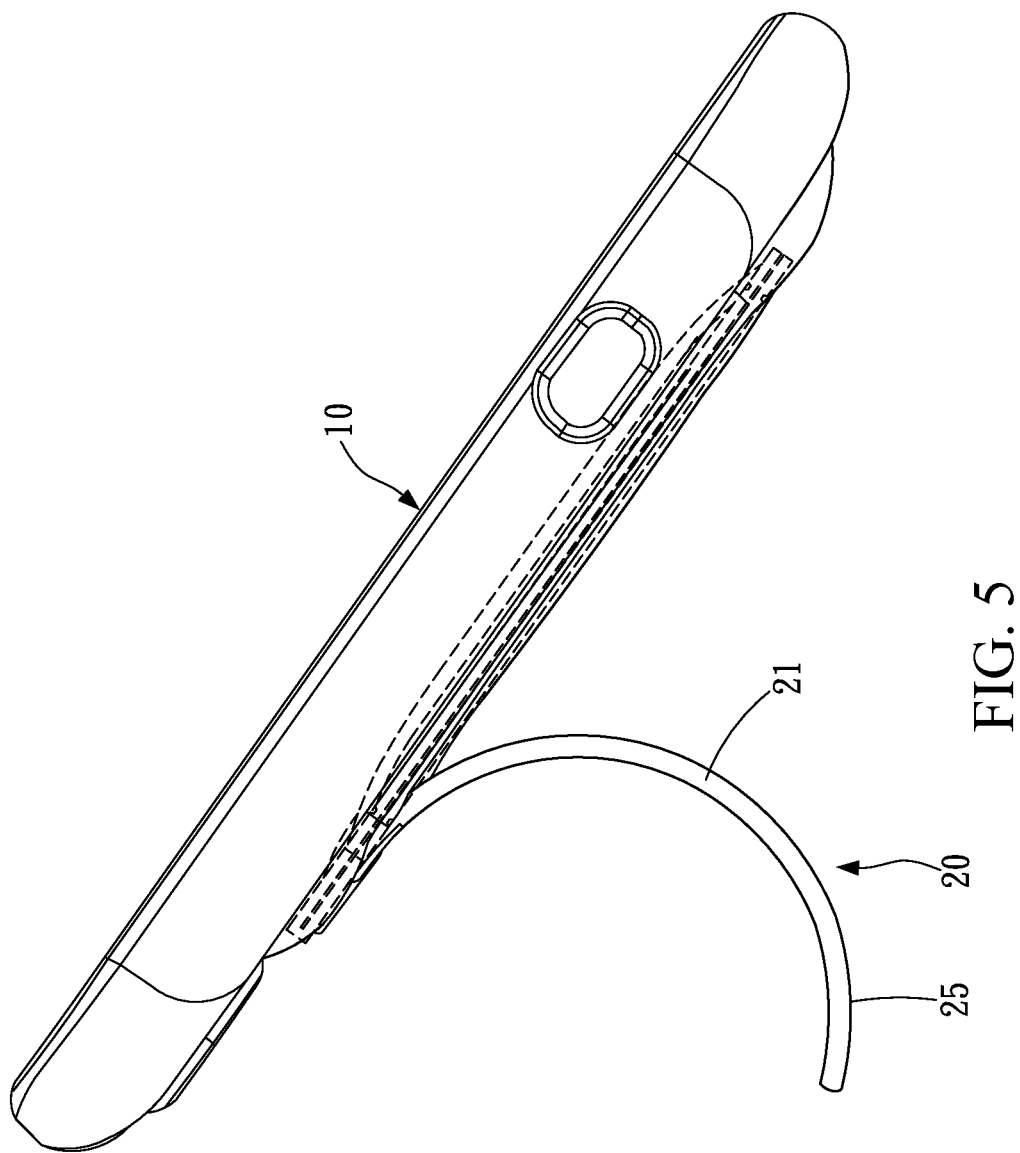
FIG. 5 is a schematic view of the support portion of the present invention when exposed.

FIG. 4 is a schematic view of the support portion of the present invention when received. FIG. 5 is a schematic view of the support portion of the present invention when exposed. Please refer to FIG. 4 and FIG. 5, the support portion 20 has a support surface 25 that faces the accommodation slot 11 when the support portion 20 is received in the accommodation slot 11. As shown in FIG. 4 and FIG. 5, in which when the first end 21 is connected to the base 10 and the second end 22 is received in the accommodation slot 11, the arrangement of the elastic part 30 makes the first end 21 experience a force, and the elastic part 30 generates an elastic deformation to make the second end extend beyond the accommodation slot 11. Furthermore, one end of the elastic part 30 of the present invention is preferably located at the first end 21, and the other end of the elastic part 30 extends to the second end 22, so that the overall structure of the support portion 20 encapsulates the elastic part 30. Based on the above, when the first end 21 experiences a force, the elastic part 30 extends to the second end 22 and generates an elastic deformation by suffering a force, the second end 22 of the support portion 20 is affected by the elastic deformation generated by the elastic part 30 to bend and form a bending portion 21. Therefore, in the support structure as shown in FIG. 5, the support surface 25 of the support portion 20 would contact a planar surface and the support portion 20 would prop up the base 10.

Figure 6:
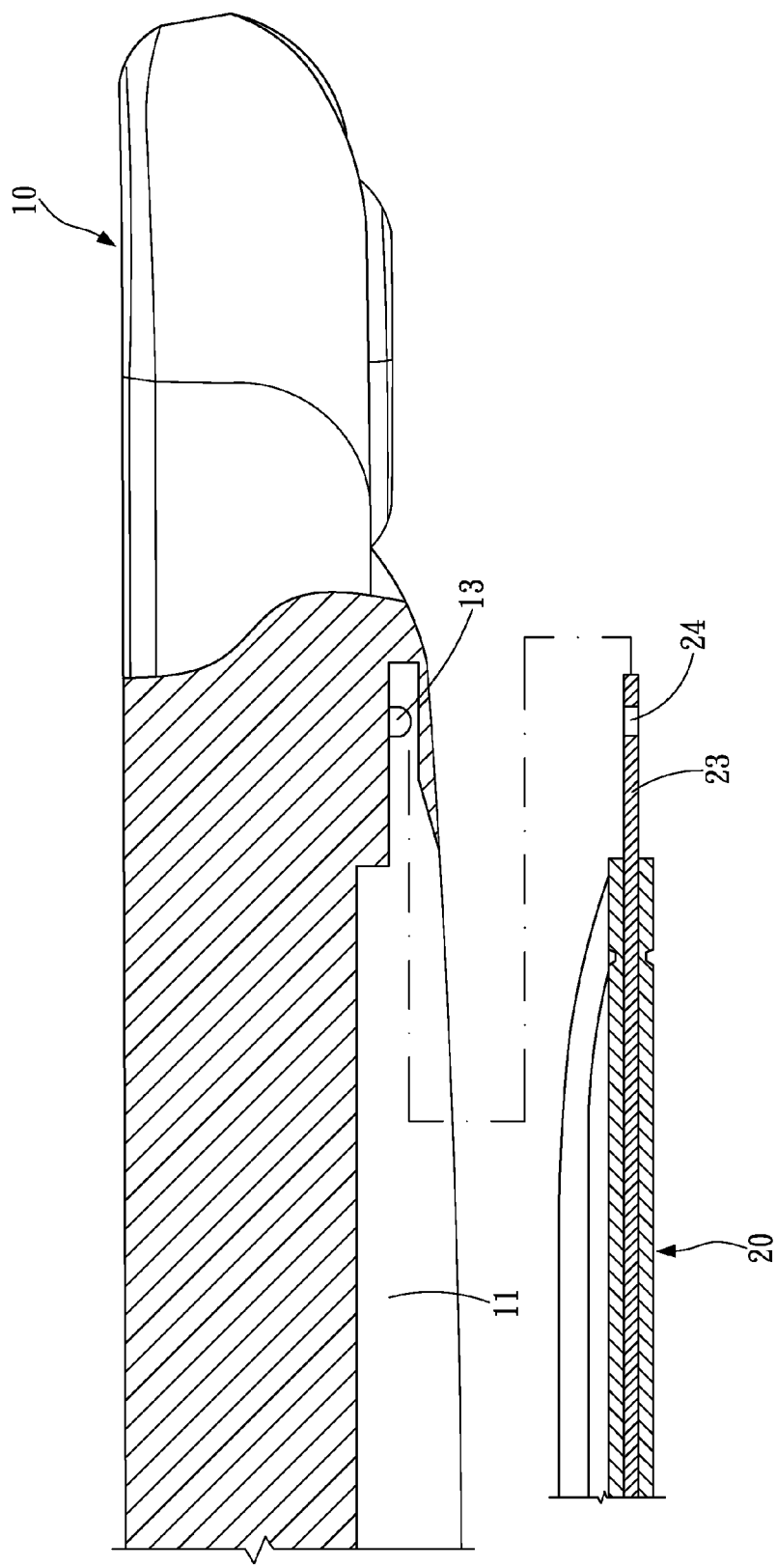
FIG. 6 is a schematic view of a combination of a base and the support portion of the present invention.

FIG. 6 is a schematic view of a combination of the base and the support portion of the present invention. Please refer to FIG. 6, in which the support portion 20 of the present invention further has a connecting part 23 located at the first end. With the connecting part 23, the support portion 20 is connected to the body 12. According to this arrangement, the body 12 has a positioning part 13, and the connecting part 23 has a positioning hole 24. The positioning part 13 locks the position of the positioning hole 24 to join the first end 21 to the body 12. The position and number of the positioning part 13 and the positioning hole 24 are in a one to one correspondence; that is, every positioning part 13 matches one positioning hole 24. In the present invention, the number of the positioning part 13 and positioning hole 24 are preferably 5 respectively, but the present invention is not limited to this. In addition to the permanent connection of the positioning part 13 and the positioning hole 24, a detachable design may also be adopted, so that the support portion 20 may be detached from the body 12 depending on the requirement of the user.

Furthermore, the support portion 20 of the present invention may not only be connected to the body 12 by the first end 21, but also be connected to a wall of the accommodation slot 11, and preferably may also be connected to the wall of the accommodation slot 11 by the connecting part 23 located at the first end 21.

In the support structure of the present invention, the support portion is connected to the base, and the shape of the support portion may be changed with the arrangement of the elastic part. Furthermore, when the support portion of the present invention is not in use, the support portion may be laid in accommodation slot, and when the users wants to put the electronic device to stand on the planar surface, the first end of the support portion experiences a force and makes the elastic part generate an elastic deformation to make the second end extend beyond the accommodation slot, the electronic device is laid on the planar surface by any side, and the support portion is supported on the planar surface, so that an angle is formed between the electronic device and the table top or the planar surface and the electronic device therefore stands on the planar surface, thereby solving the problem of inconvenience in reading and operation.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A support structure, comprising:

a base having a body and an accommodation slot, the accommodation slot being located at a center of the body;

a support portion, having a first end, a second end, a connecting part located at the first end and being connected to the body, and a support surface, wherein the second end is received in the accommodation slot, and the support surface faces the accommodation slot; and an elastic part, being encapsulated, in the support portion by in-mold molding, one end of the elastic part being located at the first end of the support portion, and the other end extending to the second end of the support portion; when the first end experiences a force, the elastic part generates an elastic deformation to make the second end extend beyond the accommodation slot and form a bending portion, so that when the support surface of the second end of the support portion is laid on a planar surface, the second end props up the base, wherein the body comprises a positioning part, the connecting part comprises a positioning hole, and the positioning part locks a position of the positioning hole to join the first end to the body.

2. The support structure according to claim 1, wherein the first end is in contact with a watt of the accommodation slot.

3. The support structure according to claim 2, wherein the connecting part is in contact with the wall of the accommodation slot.

4. The support structure according to claim 1, wherein the elastic part is spring steel.

5. The support structure according to claim 4, wherein the spring steel is manganese spring steel.

6. The support structure according to claim 1, wherein the elastic part is a steel sheet.

7. The support structure according to claim 6, wherein the steel sheet is a manganese steel sheet.

* * * * *